No. 688,442. Patented Dec. 10, 1901.
C. SHAW.
RIDING HARROW.
(Application filed May 8, 1901.)
(No Model.)
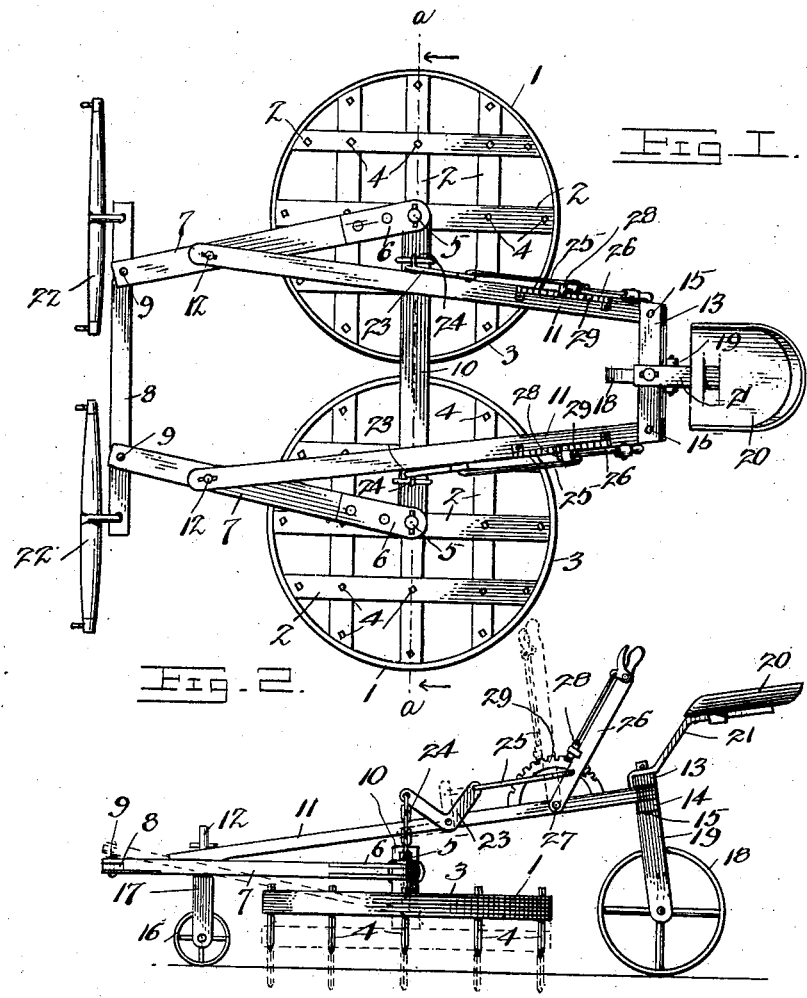
Witnesses
F. E. Alden.
J. W. Garner
C. Shaw, Inventor
by 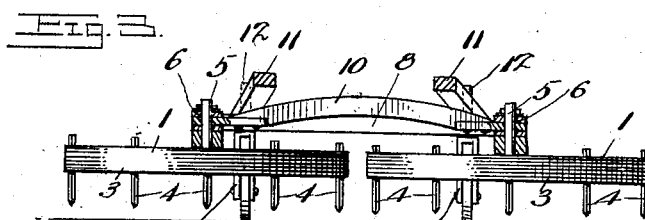
Attorneys
THE NORRIS PETERS CO., PHOTO-LITHO., WASHINGTON, D. C.

UNITED STATES PATENT OFFICE.

CHARLES SHAW, OF LAS ANIMAS, COLORADO.

RIDING-HARROW.

SPECIFICATION forming part of Letters Patent No. 688,442, dated December 10, 1901.

Application filed May 8, 1901. Serial No. 59,314. (No model.)

*To all whom it may concern:*

Be it known that I, CHARLES SHAW, a citizen of the United States, residing at Las Animas, in the county of Bent and State of Colorado, have invented a new and useful Riding-Harrow, of which the following is a specification.

My invention is an improved riding-harrow; and it consists in the peculiar construction and combination of devices hereinafter fully set forth and claimed.

In the accompanying drawings, Figure 1 is a top plan view of a riding-harrow constructed in accordance with my invention. Fig. 2 is a side elevation of the same. Fig. 3 is a transverse sectional view of the same, taken on a plane indicated by the line $a\ a$ of Fig. 1.

In the embodiment of my invention I provide a pair of revoluble harrow-frames 1 of circular form, each of which comprises a series of crossed bars 2 and circular rims 3, which are secured on the ends of said crossed bars. The latter are provided with harrow-teeth 4, which are here shown as of the usual form, but which may be of any suitable form. On the center of each of the harrow-frames is a vertical spindle 5. The said spindles 5 are journaled in bearings 6 at the rear ends of draw-bars 7. A transversely-disposed doubletree 8 is pivotally connected near its ends to the front ends of the draft-bars 7, as by bolts 9. A link-bar 10 has its ends pivotally connected to the said spindles 5, said link-bar serving to connect the rear ends of the draft-bars 7 together, and hence also connecting the revoluble harrow-frames together.

The riding-frame comprises a pair of longitudinally-disposed bars 11, which have their front ends pivotally connected to the draft-bars 7, as at 12, and have their rear ends pivotally connected to the ends of a pair of cross-bars 13 14, as by bolts 15. Thereby said riding-frame is rendered flexible. Supporting-wheels 16 are mounted in forks 17, the upper ends of which are attached to the draft-bars 7 and form the pivots 12, which connect the front ends of the bars 11 to said draft-bars. A supporting-wheel 18 is mounted in a fork 19, the upper end of which is attached to the bars 13 14. The driver's seat 20 is supported by a bar 21, which is secured on the upper cross-bar 13. The singletrees 22 are attached to the ends of the doubletree in the usual manner.

In the operation of my improved harrow the draft is applied to each of the revoluble harrow-frames independently of the other. Owing to the flexible connections between the draft-bars and the bars 11 and the flexible construction of the riding-frame, any tendency of the harrow to slide downward when the same is being used on a hillside is counteracted. The harrow-frames being capable of vertical motion independently of each other readily clear themselves of trash and the same are adapted to pass readily over stones and other obstructions. To enable the harrow-frames to be raised and lowered, either independently of each other or simultaneously, by the driver, I provide a pair of bell-crank levers 23, which are fulcrumed to the bars 11, are connected to the link-bar 10, near the ends thereof, by chains or other suitable links 24, and are connected by link-rods 25 to hand-levers 26. The latter have their lower ends pivoted to the bars 11, as at 27, and are provided with the usual spring-pressed locking-dogs 28, which by engagement with segment-racks 29, with which the bars 11 are provided, lock the said levers 26, and hence the bell-crank levers 23, in position, with the harrow-frames either raised or lowered, as may be required. Hence when the harrow is in operation one of the harrow-frames may be raised to clear obstructions, while the other continues at work. The harrow-frames may be raised from the ground and locked in an elevated position when the machine is being drawn from one place to another and it is not desired that the harrows shall operate.

Having thus described my invention, I claim—

1. The combination of harrow-frames, a link-bar flexibly attached to and connecting said harrow-frames, draft-bars flexibly connected at their rear ends to said link-bar and harrow-frames, a draft element connecting the front ends of said draft-bars, and a riding-frame, flexibly connected to said draft-bars at points between the ends thereof, said riding-frame extending rearwardly from said draft-bars and harrow-frames, whereby said harrow-frames are adapted for vertical movement independently of each other, substantially as described.

2. The combination of revoluble harrow-frames, draft-bars to which said harrow-frames are connected for revolution, a doubletree to which said draft-bars are connected, a link-bar flexibly attached to and connecting said draft-bars, a riding-frame having bars flexibly connected to said draft-bars, said riding-frame extending rearwardly therefrom, and means, carried by said riding-frame to raise and lower said harrow-frames independently of each other, substantially as described.

3. In a riding-harrow, the combination of harrow-frames, draft-bars flexibly connected thereto, a doubletree flexibly connected to the said draft-bars, a link-bar flexibly connected to said draft-bars, and means to raise and lower said harrow-frames, substantially as described.

In testimony that I claim the foregoing as my own I have hereto affixed my signature in the presence of two witnesses.

CHARLES SHAW.

Witnesses:
T. F. DEAN,
GREEN ROBINSON.